US008873447B2

(12) United States Patent
Rácz et al.

(10) Patent No.: US 8,873,447 B2
(45) Date of Patent: Oct. 28, 2014

(54) METHOD FOR CONTENT SYNCHRONIZATION WHEN BROADCASTING DATA IN A WIRELESS NETWORK

(75) Inventors: András Rácz, Budapest (HU); Gunnar Mildh, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 717 days.

(21) Appl. No.: 12/513,305

(22) PCT Filed: Oct. 31, 2007

(86) PCT No.: PCT/SE2007/050798
§ 371 (c)(1),
(2), (4) Date: May 1, 2009

(87) PCT Pub. No.: WO2008/054318
PCT Pub. Date: May 8, 2008

(65) Prior Publication Data
US 2010/0110958 A1    May 6, 2010

(30) Foreign Application Priority Data

Nov. 1, 2006 (SE) ........................................ 0602318

(51) Int. Cl.
*H04H 20/71* (2008.01)
*H04J 3/26* (2006.01)
*H04J 3/16* (2006.01)
*H04W 76/00* (2009.01)
*H04W 92/04* (2009.01)
*H04L 12/18* (2006.01)

(52) U.S. Cl.
CPC .......... *H04W 76/002* (2013.01); *H04W 92/045* (2013.01); *H04L 12/189* (2013.01)
USPC ............................. 370/312; 370/432; 370/474

(58) Field of Classification Search
None
See application file for complete search history.

(56) References Cited

U.S. PATENT DOCUMENTS

| 6,507,582 | B1 * | 1/2003 | Abrol ............................ 370/394 |
| 6,999,434 | B1 * | 2/2006 | Agrawal et al. ............... 370/331 |
| 8,089,855 | B2 | 1/2012 | Agrawal et al. |
| 8,432,893 | B2 | 4/2013 | Chitrapu et al. |
| 2003/0185178 | A1 | 10/2003 | Chitrapu et al. |
| 2005/0047397 | A1 * | 3/2005 | Sim et al. ...................... 370/352 |
| 2005/0094618 | A1 | 5/2005 | Colban et al. |

(Continued)

FOREIGN PATENT DOCUMENTS

WO    WO 2007007426 A1 *    1/2007

OTHER PUBLICATIONS

Ericsson. MBMS L2 Content Synchronization. 3GPP TSG-RAN WG3 #54. R3-061782. Nov. 6, 2006.

(Continued)

*Primary Examiner* — Jutai Kao

(57) ABSTRACT

The present invention relates to an arrangement and method for content synchronization when broadcasting data from an infrastructure node in a communication network. The arrangement comprises a receiver receiving data sequences and a transmitter for transmitting data sequences. Each data sequence has a data size and comprises a sequence number (SN). The arrangement further comprises a processing arrangement configured to add byte numbered sequence numbers to said data sequences passed between layers in a protocol stack for transmission to a transceiver station.

15 Claims, 5 Drawing Sheets

(56) References Cited

U.S. PATENT DOCUMENTS

| | | |
|---|---|---|
| 2005/0169205 A1 | 8/2005 | Grilli et al. |
| 2005/0193309 A1 | 9/2005 | Grilli et al. |
| 2006/0018279 A1 | 1/2006 | Agrawal et al. |
| 2006/0186973 A1* | 8/2006 | Satou .................... 333/260 |
| 2007/0011329 A1* | 1/2007 | Albert et al. ............. 709/226 |
| 2007/0081510 A1* | 4/2007 | Bladsjo et al. ........... 370/346 |
| 2008/0037548 A1* | 2/2008 | Yi et al. .................. 370/394 |
| 2008/0056273 A1* | 3/2008 | Pelletier et al. ......... 370/395.21 |
| 2008/0101270 A1* | 5/2008 | Kekki et al. .............. 370/312 |
| 2008/0256272 A1* | 10/2008 | Kampmann et al. ...... 710/57 |
| 2009/0067325 A1* | 3/2009 | Baratakke et al. ........ 370/229 |
| 2011/0208867 A1* | 8/2011 | Anthias et al. ........... 709/227 |
| 2012/0287841 A1* | 11/2012 | Takahashi et al. ........ 370/312 |

OTHER PUBLICATIONS

MBMS L2 Content Synchronization. 3GPP TSG-RAN WG3 #55. R3-070141. Feb. 12, 2007.

Alcatel, et al. Text Proposal Architecture of Content Synchronization. 3GPP Draft R3-061583. Oct. 17, 2006.

* cited by examiner

METHOD FOR CONTENT SYNCHRONIZATION WHEN BROADCASTING DATA IN A WIRELESS NETWORK

TECHNICAL FIELD

The present invention relates to telecommunications systems in general and distribution of broadcast/multicast data in cellular systems in particular.

BACKGROUND

In MBMS architecture, the BM-SC is the Broadcast Multicast Service Centre, which is the application level server providing the multimedia content. This is illustrated generally in FIG. 8.

The MBMS GW is responsible for the user plane processing of the MBMS data, including such functions as content synchronization and delivering the data over a multicast IP transport to the relevant eNodeBs. The MBMS GW also executes control over the start and stop of the services and acts as a mediator between the access agnostic multimedia content sources and the LTE specific access network.

The MCE (MBMS Control Entity) is a radio resource control entity, which is responsible mainly for the coordinated allocation of radio resources over multiple cells in case of Single Frequency Network (SFN) transmission mode.

To efficiently support the distribution of broadcast/multicast data in cellular systems (e.g., the distribution of multimedia content, TV channels), the concept of Single Frequency Network (SFN) transmission is often used. This means that the same content is sent from multiple base stations in a time synchronized manner, which allows the receiving user terminal to combine the signals from multiple base stations and thereby achieve a good reception quality also at the cell edge.

In order the SFN concept to work, a mechanism is needed that achieves the synchronization of both the content, meaning that the same data is sent from multiple base stations in the same radio resource block and also the time synchronization of the base stations, meaning that the transmission in the identical radio resource blocks at multiple base stations are time aligned accurately enough.

The SFN concept is used, for instance, for the realization of the Multimedia Broadcast Multicast Service (MBMS) in UTRAN and the same principle will be used in the LTE system as well.

In UTRAN the MBMS content synchronization is done by the RNC node as part of the resource and scheduling control functionality in the MAC layer. However, in order this solution to work it is required to locate the radio interface scheduling and L2 processing (e.g., segmentation) in a central user plane processing node. In LTE these radio resource control functions will be located in the eNodeB along with the corresponding MAC and lower layer protocol layers. Therefore the earlier solutions are not favorable for LTE and they are not directly applicable either, unless some of the L2 protocol layers (e.g., RLC/MAC) are moved from the eNodeB to the central MBMS Gateway (MBMS GW) node or some new protocol layers with L2 functionality (e.g., segmentation/concatenation) are introduced between the RLC/MAC and upper layers.

Similar solutions are being discussed also for LTE, where the user plane processing in the MBMS GW would include RLC/MAC layer or a newly introduced protocol layer doing the segmentation/concatenation according to the radio resource block size.

These solutions are not desirable in LTE since they would require RAN functionality in the MBMS GW node, which would add to the complexity of the node and would significantly differ from the user plane processing functions in the central node used for unicast traffic.

It would be desirable to use a content synchronization method that allows keeping the user plane processing in the MBMS GW node as simple as possible and free of any RAN specific processing, i.e., similar to the user plane processing functionality for unicast traffic.

SUMMARY

The present invention solves the problem of content synchronization by the use of byte level sequence numbering in the central MBMS GW node. This means that the GW only needs to add byte numbered sequence numbers to the bypassing PDUs, i.e., it can be free of any RAN specific user plane processing. The receiving eNodeBs will be able to unambiguously map the received MBMS PDUs to the corresponding radio resource block by relying on the byte numbering and on the pre-configured radio resource block sizes.

Other advantages of the invention according to the described embodiments include:
- A simple user plane processing function in the central GW node will be achieved by the user plane protocol stack can be identical to the one used for unicast data.
- The GW node may be free of any RAN specific user plane processing (e.g., segmentation/concatenation, knowledge about radio resource block parameters, etc.)
- No new protocol layer needs to be defined, the required sequence numbering can be added to the header of the tunneling protocol (e.g., into GTP-U).

The problem is solved and the advantages are obtained by means of an arrangement for content synchronization when broadcasting data from an infrastructure node in a communications network. The arrangement comprises a receiver receiving data sequences and a transmitter for transmitting data sequences, wherein each data sequence has a data size and comprises a sequence number. The arrangement further comprises a processing arrangement configured to add byte numbered sequence numbers to said data sequences passed between layers in a protocol stack for transmission to a transceiver station.

Preferably, sequence numbers are added into layer of transport network protocol. In one embodiment, the sequence number of a subsequent packet is obtained by incrementing a sequent number of previous packet by size of a previous packet. The size is expressed in number of bytes of said sequence. According to one embodiment the sequence numbers are added to the header of a tunneling protocol, e.g. GPRS Tunneling Protocol-User. The arrangement may support variable Multiple Access Control (MAC) header size. The arrangement may be configured to add a packet level sequence number to the data sequences together with a byte level sequence number. In an alternative embodiment the arrangement is configured to add a size of a MAC overhead corresponding to said data sequences to a byte sequence number assigned to said data sequence.

In one preferred embodiment data sequences comprising a packet header and no user data part are transmitted. The transmission is at a fixed output rate performing a buffering in said arrangement and sending said data sequences when said buffer is becoming empty. The transmission may carried out by measuring an output rate of the arrangement and based on that, predicting a buffer occupancy at a receiver node and sending the data sequences when said receiver buffers are predicted to become empty.

The invention also relates to a base station for content synchronization when broadcasting data in a communications network. The base station in its simplest form comprises a receiver receiving data sequences (PDUs) and a transmitter for transmitting data sequences, wherein each data sequence has a data size and comprises a sequence number. A data sequence comprises added byte numbered sequence numbers to said data sequences passed between layers in a protocol stack and that said base station comprises a processing arrangement configured to map said received data sequences to a corresponding radio resource block by relying on a byte numbering and on a pre-configured transport block, TB, sizes. Preferably, the data sequences are multimedia data sequences. According to one embodiment the data sequences may be fixed size or variable size TBs. The size of said TBs is assumed to be pre-configured by a Multimedia Broadcast Multicast Service (MBMS) radio resource control entity before the start of a MBMS service. In one embodiment, the processing arrangement is configured to determine if a PDU is lost and which PDU or which part of a PDU it should resume transmission and determine a PDU with partial content. If data sequences lost, the processing arrangement may use a sequence number of a subsequent received PDU and a sequence number of a last received PDU to determine the lost number of bytes of data and determine transmission continuation with subsequent PDU in forgoing TB.

According to one embodiment, a Multiple Access Control (MAC) protocol header within said TB is variable and the base station receives a data sequence with a packet level sequence number added to said PDUs together with byte level sequence number. In an alternative embodiment. Multiple Access Control (MAC) protocol header within said TB is variable and it receives a data sequence with size of a MAC overhead corresponding to a PDU added to the byte sequence number assigned to said PDU.

Preferably, the base station may comprise a buffer configured to receive data sequences comprising a packet header and no user data part, said packet header further including a byte level sequence number, which is set according to a virtual data associated with said data sequence Thus, the processing arrangement is configured to transmit a packet, P, with byte count b(P) at a time where an internal byte count is B(t)=b(P), where t is a current time maintain relating to an internal byte sequence number that counts transport block containers having elapsed up said current time (t), B(t) is an elapsed transport block containers up to time t.

Most preferably, the transport blocks are configured by a central control entity (MCE) in the network to be used for an MBMS transmission at each base station and designate an absolute time for transmission started. The configuration may comprise on or several of: transport block encoding format, time-frequency resources assigned, and recurrence pattern in time.

The invention also relates to a method of content synchronization when broadcasting data in a communications network. The method comprises adding byte numbered sequence numbers to data sequences (PDUs) for transmission to a transceiver station.

BRIEF DESCRIPTION OF THE DRAWINGS

The present invention will be described in an exemplary way with reference to non-limiting embodiments illustrated in attached drawings, in which.

DETAILED DESCRIPTION

Figure 1:
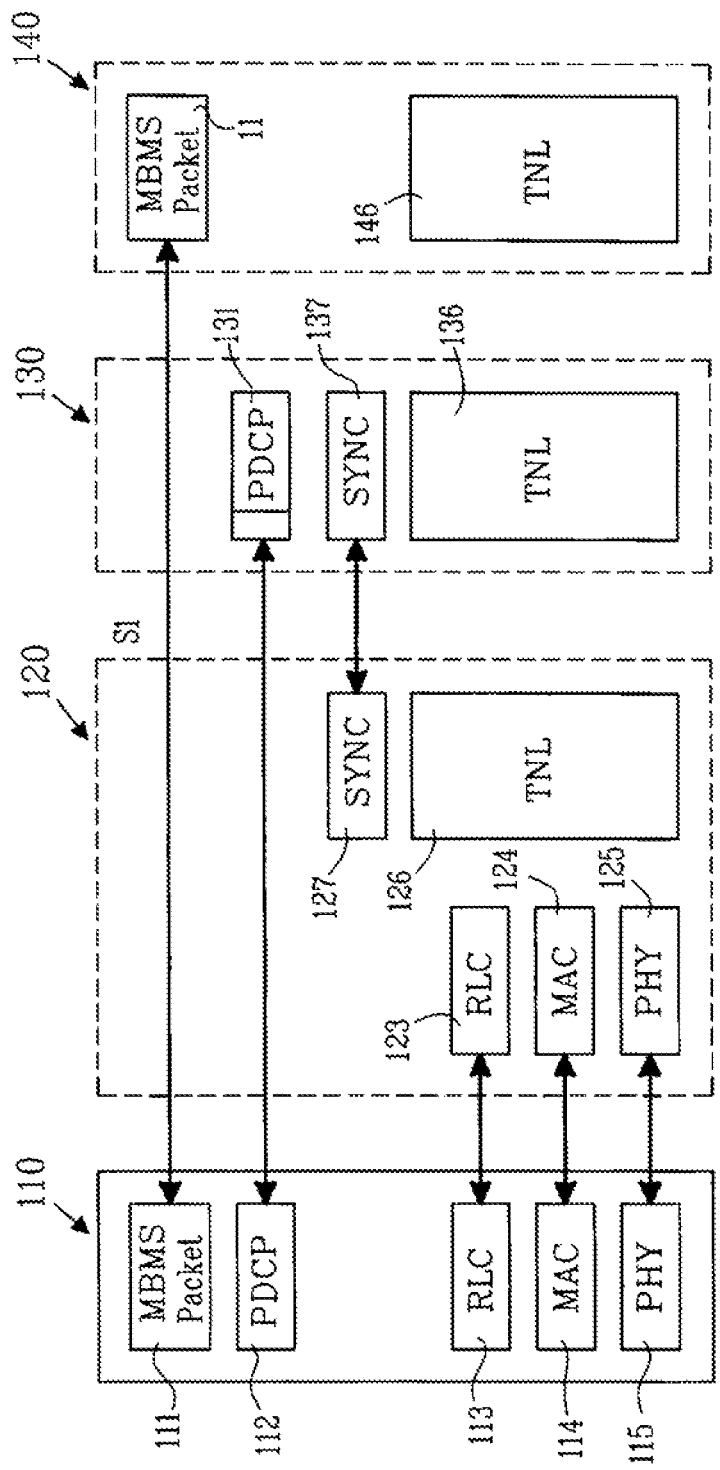
FIG. 1 illustrates schematically a MBMS protocol architecture.

FIG. 1 illustrates an example overall user-plane architecture of a MBMS protocol, e.g. for LTE.

IN THE FIGURE:

110 designates a User Equipment comprising protocol layers MBMS packet 111, PDPC 112, RNC 113, MAC 114 and PHY 115.

120 designates a base station, eNodeB, comprising protocol layers RNC 123, MAC 124, PHY 125, TNL 126 and Sync 127.

130 designates a Central Gateway Node, comprising protocol layers PDPC 132, TNL 136 and SYNC 137.

140 designates eBM-SC comprising protocol layers MBMS packet 141 and TNL 146. eBM-SC is the source of the MBMS traffic.

SYNC protocols 27 and 137 (further described below) is the protocol to synchronize data used to generate a certain radio frame. SYNC protocol between the MBMS gateway and the eNBs ensures that the same content is sent over-the-air from all the eNBs.

The central Gateway (GW) node 130 (e.g., MBMS GW) includes user plane processing functionality also covering the functions needed for content synchronization. The SYNC 127/137 protocol layer shown in the figure is a logical layer that implements the required support for content synchronization. However, this does not necessarily mean a new protocol layer, the required functions (e.g., sequence numbers) may be added to the existing layers as well, e.g., into the TNL protocol layer 126, 136, 146 or into the PDCP layer 111, 131.

Figure 2:
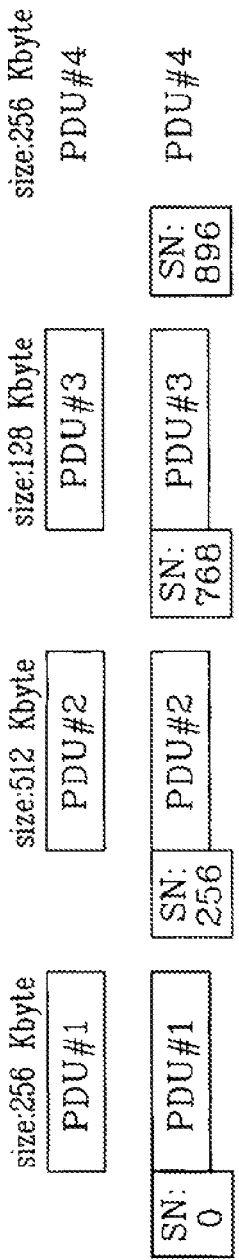
FIG. 2 illustrates schematically adding byte level sequence numbers.

According to this embodiment, the GW 130 adds byte level sequence numbers to the PDCP 131 PDUs (Protocol data Units). An example is shown in FIG. 2. The SN (Sequence Number) of the next packet is obtained by the SN of the previous packet incremented by the length of the previous packet (expressed in number of bytes), i.e.

$$SN_{PDU\#n} = SN_{PDU\#n-1} + \text{size of PDU}\#n, \text{ where } n=1, 2, 3, \ldots.$$

The sizes illustrated in the drawing are given as example and do not limited the invention.

This sequence number can be included as part of the Transport Network Layer (TNL). For example, it can be added to the header of the tunneling protocol or it could be added to the header of the PDCP protocol. Alternatively, a new protocol layer can be introduced for that purpose between the eNodeB and the GW. In preferred embodiment, the tunneling protocol sequence number, e.g., GTP-U (GPRS Tunneling Protocol User) protocol sequence number possibly extended in length is used.

As mentioned earlier, at the start of the MBMS service the MBMS resource control entity (e.g., MBMS Control Server: MCS) configures the radio resources to be used at the eNodeBs for that particular MBMS service and it also specifies an absolute time when the eNodeBs should start the transmission. The control server also triggers the GW to start sending MBMS data with the byte sequence number reset to an initial value. From that point on, the synchronization is self-sustained based on the byte level sequence number method as described, as long as the buffers at the eNodeBs 120 do not run out of data. However, this may not be possible to guarantee in all cases, as the MBMS data may be bursty, meaning that there might be idle gaps between bursts of packets.

The following method is an extension to the basic sequence numbering solution in order to maintain the synchronization also in cases of idle gaps in the data stream.

In order to be able to keep the synchronization at the eNodeBs it needs to be ensured that the buffer 1204 (FIG. 7) at the eNodeBs do not become empty. Therefore, during times of idle gaps in the MBMS data stream, the GW inserts dummy PDUs into the stream to fill the eNodeB buffers with virtual data. The dummy PDUs contain only a packet header and no user data part. The packet header of the dummy PDU includes a byte level sequence number, similarly to normal data PDUs. The byte level sequence number is set according to the virtual data associated with the dummy PDU. The dummy PDUs are sent from the GW to the eNodeB. These PDUs are typically not sent on the radio interface. However, it could be allowed to send the dummy PDU also over the radio interface, e.g., as padding in the physical transport block. The reason for sending the dummy PDU over the radio interface could be, for instance, to avoid that the UE interprets the idle gap as a radio link error.

When the eNodeB receives a dummy PDU, it can handle the packet similarly to normal data packet, i.e., it can buffer the packet, schedule it for transmission, etc. The only difference in the handling of these dummy packets compared to normal data packets is that there is no real user data transmission associated with them on the radio interface. These PDUs are used just as virtual data for maintaining the synchronization. The use of dummy PDUs is illustrated in FIG. 3.

Figure 3:
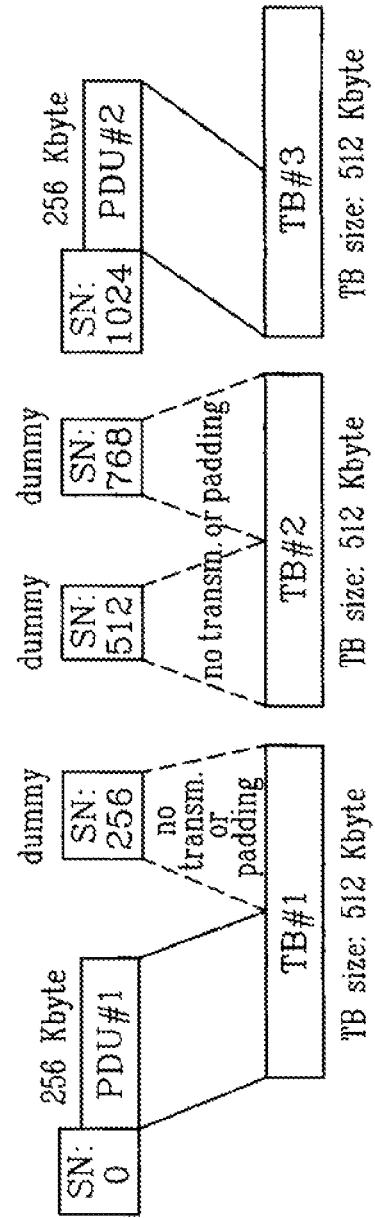
FIG. 3 illustrates schematically mapping of the byte numbered PDUs into the appropriate radio resource blocks at the eNodeB.
Figure 7:
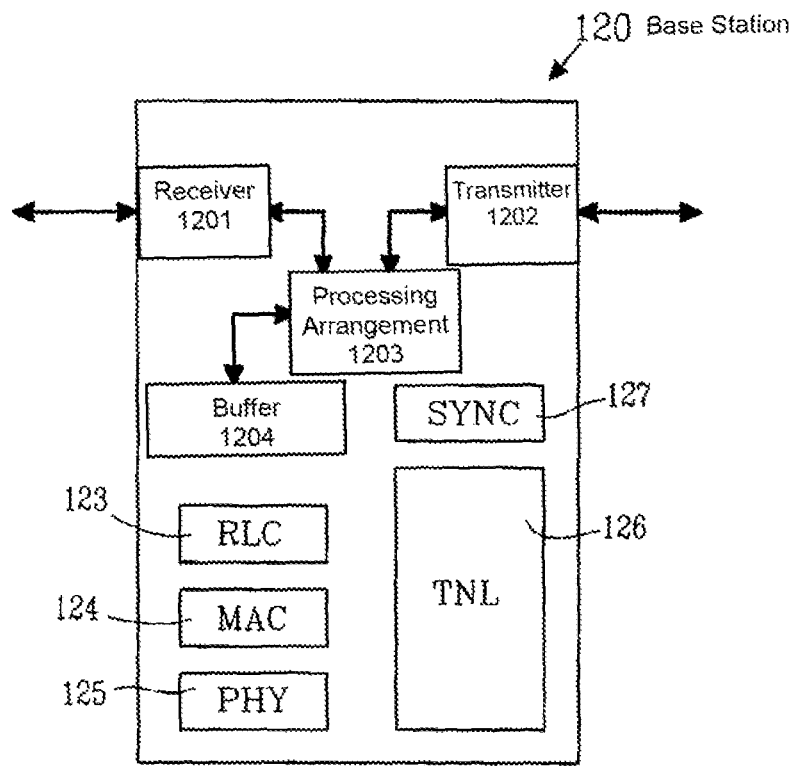
FIG. 7 is a schematic block diagram of a base station according to the present invention.
Figure 8:
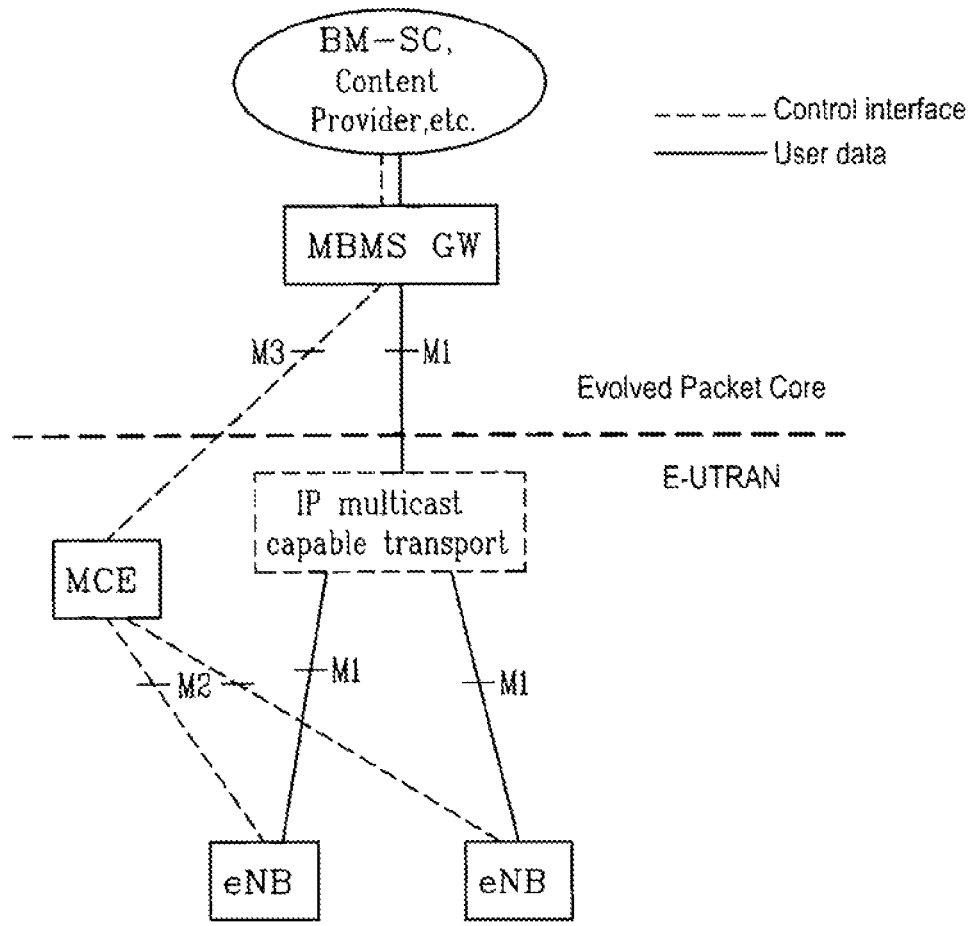
FIG. 8 illustrates schematically the LTE MBMS Architecture

FIG. 3 shows also how the eNodeB 120 of FIG. 1 and FIG. 7 can unambiguously map the received PDUs, received by the interface 1201 into corresponding Transport Block (TB).

Generally, a transport block is an encoded data block prepared for radio interface transmission and it is transmitted in a designated time-frequency resource.

As shown in the example, there are temporarily no data to send after PDU#1. Therefore the GW inserts dummy PDUs, each with a virtual size of 256 Kbyte as indicated in the SN field of the packet header (it is just an example, it could be any size of virtual data). These PDUs do not contain a data part, only the header, as also shown in the figure. When the dummy PDUs arrive to the eNodeB, the eNodeB processes them as it would do for normal data packets, i.e., it keeps track in which radio resource block these packets would have been transmitted, if they had been real data. Thereby the eNodeB can continuously maintain in which radio resource block the next data should be sent. That is, if a new PDU comes in, after the end of the idle gap (PDU#2 in the example), each eNodeB will know unambiguously at which time instant and in which radio resource block the data needs to be sent. The arriving data PDU will be sent in continuation of the dummy PDUs, i.e., after the virtual sending of the dummy PDUs are finished.

There needs to be a procedure in the GW to determine when it should send dummy PDUs, i.e., to determine when the eNodeB buffers are becoming empty. There can be basically two different ways to solve this issue:
 by sending at a fixed output rate from the GW, performing the buffering in the GW and sending dummy PDUs when the GW buffer is becoming empty, or
 by measuring the output rate at the GW and based on that, predicting the buffer occupancy at the eNodeB and sending dummy PDUs when the eNodeB buffers are predicted to become empty.

In this case of fixed output rate and buffering at the GW, it will send the MBMS data packets at a fixed output rate corresponding to the radio link rate that has been allocated for the given MBMS service on the radio interface. As a result of the fixed output rate at the GW there needs to be buffering done in the GW in order to handle the burstiness of the traffic stream, i.e., to absorb the excess traffic during times of a packet burst. Note that some buffering needs to be maintained also in the eNodeB in order to account for the delay variations on the transport network links between the GW and the eNodeBs.

When the buffer in the GW is becoming empty the GW simply inserts dummy PDUs into the buffer with a virtual data size determined by the GW.

In the case of measured output rate and no-buffering at the GW, the GW is continuously measuring the current rate at which MBMS data packets are passing by (after being processed in the GW), i.e., no buffering is done in the GW. Based on the output rate measured for a certain time window, the GW can predict the amount of data in the eNodeB buffers. When the GW anticipates that the eNodeB buffers are becoming empty, i.e., the measured output rate is below the radio link rate for some time, then it starts inserting dummy PDUs into the stream. The size of the virtual data associated with the dummy PDUs is determined by the GW. (Note that the dummy PDUs need to be taken into account when measuring the output rate at the GW.)

This solution may be extended with an optional reporting mechanism from the eNodeB to the GW, where the eNodeB can send a report to the GW when the buffer level at the eNodeB falls below a certain threshold. In response to this indication the GW can start inserting dummy PDUs into the stream as long as the buffer level in the eNodeBs goes above the threshold (in which case a new indication can be sent to the GW).

Finally, there might still be certain exceptional cases when the eNodeB might lose the synchronization. To handle such cases the eNodeB can use a reporting mechanism toward the GW and/or toward the MBMS control server to indicate the loss of synchronization. (An indication for a lost synchronization may be the eNodeB buffer becoming empty or the indication may come from radio interface measurements done either by the eNodeB or by the UE.) In such cases the synchronization can be re-established with a method similar to the one used for initial synchronization. The MBMS control server can assign a re-start time for the eNodeBs specified in absolute time and may also reset the sequence number at the GW. The required signalling communication for re-establishing the synchronization may involve the MBMS control server, the eNodeBs and the GW, where either the control server or the GW may be the master node coordinating the process. The detailed signalling procedure can be drawn accordingly.

In order to map the PDUs into the correct transport blocks the eNodeB can maintain an internal byte sequence number that counts the transport block containers (in bytes) that have elapsed up to the current time t (measured from a designated start time T0). Let us denote the elapsed transport block containers up to time t by B(t). Then the eNodeB should transmit the packet P with byte count b(P) at exactly the time where the eNodeB internal byte count B(t)=b(P).

Before the transmission of broadcast services can be started, the central control entity (MCE) in the network has to configure the transport blocks (i.e., their encoding format, the time-frequency resources assigned to them, including the recurrence pattern in time, etc.) to be used for MBMS transmission at each eNodeB and should designate an absolute time when the transmission should be started (i.e., designate T0).

Figure 4:
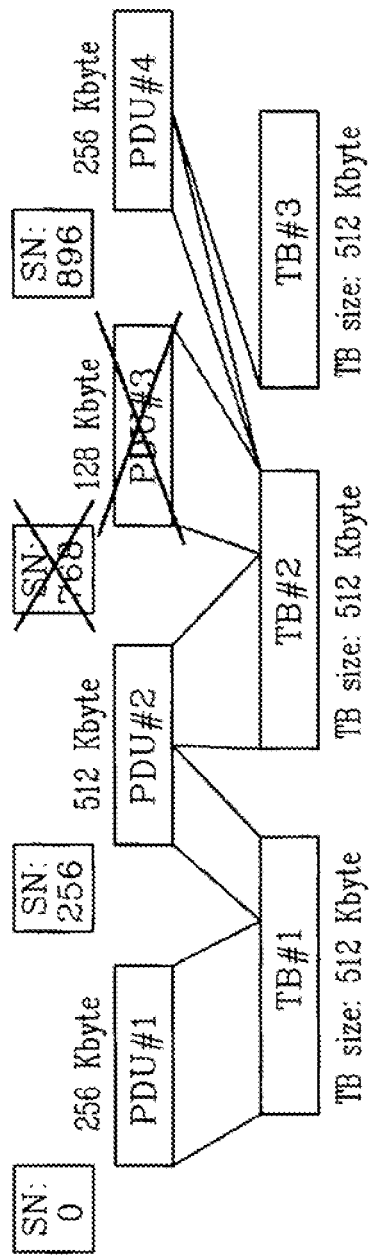
FIG. 4 illustrates schematically mapping PDUs into the appropriate radio resource blocks at a eNodeB.

FIG. 4 shows how the eNodeB may map the PDUs into the appropriate TBs in case some of the PDUs get lost (crossed over) on the transport network.

For example, if PDU#3 is lost on the transport network, it means that the sequence number of the lost PDU is unknown as well. In this case the eNodeB may determine which PDU or which part of a PDU it should resume transmission in TB#3. Whether TB#2 can be sent out by the eNodeB with partial content only, i.e., with parts of the TB filled up with padding, depends on the L1 interface details and it is out of the scope of the content synchronization scheme.

The eNodeB may use the sequence number of the next received PDU (i.e., PDU#4) and the sequence number of the last received PDU (i.e., PDU#2) to determine how many bytes of data is missing and determine where it should continue with PDU#4 in TB#3.

Figure 5:
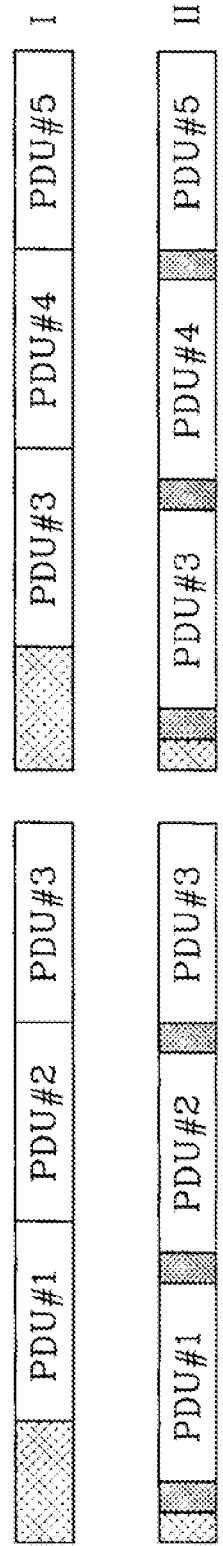
FIG. 5 illustrates schematically fixed vs. variable MAC header size.
Figure 6:
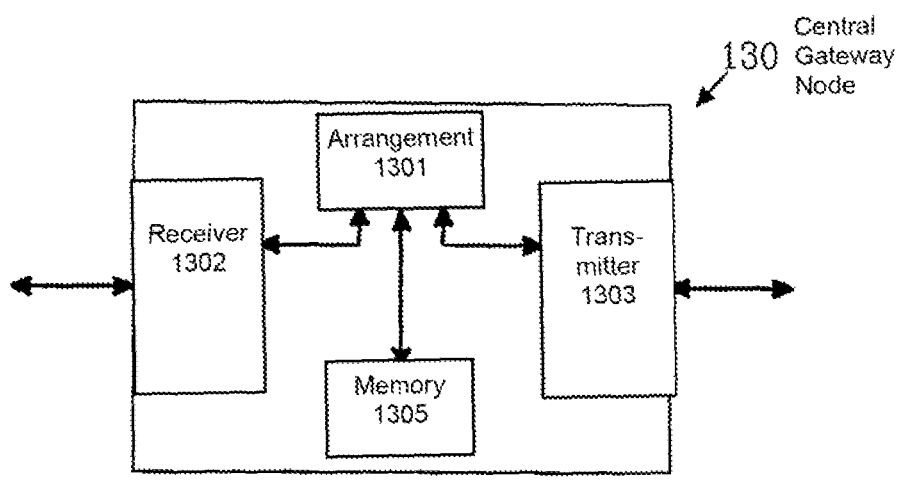
FIG. 6 is a schematic block diagram of an arrangement according to the present invention.

The above sequence numbering scheme may slightly differ depending on how the multiplexing of upper layer PDUs into TBs are done in the eNodeB. It is possible to differentiate basically two main alternatives depending on whether the MAC protocol header within the TB is fixed or has dynamic size. For instance, the size of the MAC header could depend on the number of PDUs multiplexed into that particular TB. The difference between fixed and variable MAC header size cases are illustrated in FIG. 5, in which the upper sequence (I) illustrates fixed size and lower (II) sequence variable size.

Thus, fixed MAC header size per TB means that the number of user bits that can be carried in one TB is fixed.

Variable MAC header size per TB means the size of the MAC header varies depending on the numbered of multiplexed PDUs, and the number of information bits that can be carried in a TB depends on the number of PDUs that have been multiplexed into the TB. This could mean for instance, that there is a fixed size MAC header part added to each multiplexed PDU.

In the basic solution, it is assumed fixed MAC header size, i.e., fixed number of user bits per TB and the simple byte sequence numbering solution for content synchronization is sufficient.

In cases of variable MAC header size, the pure byte sequence numbering may not be sufficient in all cases, especially in case when a number of consecutive PDUs get lost on the transport network. In this case, it is not enough to know only how many information bytes were lost in order the eNodeB can catch up with correct synchronization, the eNodeB should also know how many PDUs have been lost.

In order to support the variable MAC header size cases, two possible solutions may be used:
  The GW node adds a packet level sequence number to the PDUs beside the byte level sequence number.
  The GW adds the size of the MAC overhead corresponding to the PDU to the byte sequence number assigned to that PDU.

The invention may be implemented in the GW using an arrangement 1301 as illustrated schematically in FIG. 7. The arrangement comprises a receiver 1302, which receives PDUs and a transmitter 1303, which transmits PDUs. A processor 1303 handles the adding of byte numbered sequence numbers to the PDUs passed between layers in the protocol stack for transmission to the eNodeB. The arrangement may further comprise a memory 1305 for storing data and instructions. Clearly, this arrangement can be implanted using the logical units of the GW.

The invention is not limited to the mentioned examples, standards and technical terms. Thus, the invention may be generalized by a gateway node, which comprises processing means for content synchronization. The processing means is arranged to operatively use byte level sequence numbering, whereby the processing means is arranged to add byte numbered sequence numbers to bypassing data sequences passed between the layers in a protocol stack to be send to a transceiver station.

ABBREVIATIONS

SFN Single Frequency Network
MBMS Multimedia Broadcast Multicast Service
LTE Long Term Evolution
RNC Radio Network Controller
MAC Multiple Access Control
RAN Radio Access Network
PDU Protocol data Units
TNL Transport Network Layer
PDPC Packet Data Convergence Protocol,
SN Serial Number
GTP-U GPRS Tunneling Protocol-User
TB Transport Block
RLC Radio Link Control

The invention claimed is:

1. An arrangement for content synchronization when broadcasting data from an infrastructure node in a communications network, said arrangement comprising:
    a receiver receiving data sequences;
    a transmitter for transmitting data sequences, wherein each data sequence has a data size and comprises a sequence number (SN); and
    a processing arrangement, in a multimedia broadcast multicast service (MBMS) gateway (GW) node, configured to add byte numbered sequence numbers to said data sequence, passing between layers in a protocol stack, for transmission to a transceiver station, wherein said byte numbered sequence numbers enable content synchronization, such that the same data is sent from two or more base stations in the same radio resource block.

2. The arrangement of claim 1, wherein said sequence numbers are added into layer of transport network protocol.

3. The arrangement of claim 2, wherein said sequence numbers are added to the header of a tunneling protocol.

4. The arrangement of claim 3, wherein said tunneling protocol is GPRS Tunneling Protocol—User.

5. The arrangement of claim 1, wherein the sequence number of a subsequent packet is obtained by incrementing a sequence number of a previous packet by size of the previous packet.

6. The arrangement of claim 5, wherein said size is expressed in number of bytes of said sequence.

7. The arrangement of claim 1, characterized by supporting variable Multiple Access Control (MAC) header size.

8. The arrangement of claim 7, wherein said arrangement is configured to add a packet level sequence number to said data sequences together with a byte level sequence number.

9. The arrangement of claim 8, wherein said arrangement is configured to add a size of a MAC overhead corresponding to said data sequences to a byte sequence number assigned to said data sequence.

10. The arrangement of claim 8, configured to transmit data sequences comprising a packet header and no user data part.

11. The arrangement of claim 10, said transmission is at a fixed output rate performing a buffering in said arrangement and sending said data sequences when said buffer is becoming empty.

12. The arrangement of claim 10, said transmission is by measuring an output rate of the arrangement and based on that, predicting a buffer occupancy at a receiver node and sending said data sequences when said receiver buffers are predicted to become empty.

13. A method of content synchronization when broadcasting data in a communications network, the method comprising:

in a multimedia broadcast multicast service (MBMS) gateway (GW) node, adding byte numbered sequence numbers to data sequences (PDUs) passed between layers in a protocol stack for transmission to a transceiver station;

wherein said byte numbered sequence numbers enable content synchronization, such that the same data is sent from two or more base stations in the same radio resource block.

14. The method of claim 13, wherein said data sequences are multimedia data sequences.

15. The method of claim 13, comprising determining if a data sequence is lost and which data sequence or which part of said data sequence should be resumed upon transmission and further comprising using a sequence number of a subsequent received data sequence and a sequence number of a last received data sequence to determine the lost number of bytes of data and determine transmission continuation with subsequent data sequence.

\* \* \* \* \*

UNITED STATES PATENT AND TRADEMARK OFFICE
CERTIFICATE OF CORRECTION

| | | |
|---|---|---|
| PATENT NO. | : 8,873,447 B2 | Page 1 of 1 |
| APPLICATION NO. | : 12/513305 | |
| DATED | : October 28, 2014 | |
| INVENTOR(S) | : Racz et al. | |

It is certified that error appears in the above-identified patent and that said Letters Patent is hereby corrected as shown below:

In The Drawings

In Fig. 1, Sheet 1 of 5, delete Tag "11" and insert Tag -- 141 --, therefor.

In The Specification

In Column 3, Line 34, delete "embodiment." and insert -- embodiment, --, therefor.

In Column 3, Line 54, delete "on" and insert -- one --, therefor.

In Column 4, Line 26, delete "PDPC" and insert -- PDCP --, therefor.

In Column 4, Line 32, delete "PDPC 132," and insert -- PDCP 131, --, therefor.

In Column 4, Line 50, delete "PDCP layer 111," and insert -- PDCP layer 112, --, therefor.

In The Claims

In Column 8, Line 32, delete "PDPC" and insert -- PDCP --, therefor.

Signed and Sealed this
Twenty-second Day of September, 2015

Michelle K. Lee
*Director of the United States Patent and Trademark Office*